US012755628B2

(12) United States Patent
Petladwala et al.

(10) Patent No.: US 12,755,628 B2
(45) Date of Patent: Oct. 6, 2026

(54) OBJECT PRESENCE DETECTION SYSTEM, OBJECT PRESENCE DETECTION METHOD AND COMPUTER READABLE MEDIUM

(71) Applicant: NEC Corporation, Tokyo (JP)

(72) Inventors: Murtuza Petladwala, Tokyo (JP); Tomoyuki Hino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 206 days.

(21) Appl. No.: 18/688,099

(22) PCT Filed: Sep. 15, 2021

(86) PCT No.: PCT/JP2021/033966
§ 371 (c)(1),
(2) Date: Feb. 29, 2024

(87) PCT Pub. No.: WO2023/042308
PCT Pub. Date: Mar. 23, 2023

(65) Prior Publication Data

US 2024/0355198 A1 Oct. 24, 2024

(51) Int. Cl.
*G08G 1/00* (2006.01)
*G08G 1/01* (2006.01)
(Continued)

(52) U.S. Cl.
CPC ......... *G08G 1/0125* (2013.01); *G08G 1/0116* (2013.01); *G08G 1/04* (2013.01); *G08G 1/052* (2013.01); *G08G 1/056* (2013.01)

(58) Field of Classification Search
CPC ...... G08G 1/0125; G08G 1/0116; G08G 1/04; G08G 1/052; G08G 1/056; G08G 1/0133; G08G 1/0141; G08G 1/00
(Continued)

(56) References Cited

U.S. PATENT DOCUMENTS

2016/0275788 A1* 9/2016 Wu .......................... G08G 1/02
2018/0357542 A1* 12/2018 Wu .......................... G06N 5/01
2021/0241615 A1* 8/2021 Narisetty ............ G08G 1/0141

FOREIGN PATENT DOCUMENTS

WO 2020/116030 A1 6/2020
WO 2021/106025 A1 6/2021

OTHER PUBLICATIONS

International Search Report for PCT Application No. PCT/JP2021/033966, mailed on Nov. 30, 2021.

* cited by examiner

*Primary Examiner* — Shardul D Patel
(74) *Attorney, Agent, or Firm* — Sughrue Mion, PLLC

(57) ABSTRACT

An object of the present disclosure is to provide an object presence detection system, an object presence detection method and a non-transitory computer readable medium capable of detecting the presence of an object more accurately. In one aspect, an object presence detection system includes at least one memory configured to store instructions; and at least one processor configured to execute the instructions to: obtain time-distance graph information of an oscillation signal for each distributed sensing portion, while the oscillation signal is acquired by the plurality of distributed sensing portions and is induced by traffic of a moving object, detect impulse response using the time-distance graph information measured by the plurality of distributed sensing portions, and detect a presence of the moving object, which includes moving direction information of the moving object, using the impulse response information in the time-distance graph information.

10 Claims, 6 Drawing Sheets

(51) Int. Cl.

| | |
|---|---|
| ***G08G 1/04*** | (2006.01) |
| ***G08G 1/052*** | (2006.01) |
| ***G08G 1/056*** | (2006.01) |

(58) Field of Classification Search

USPC .......................................................... 701/117

See application file for complete search history.

[Fig. 1]
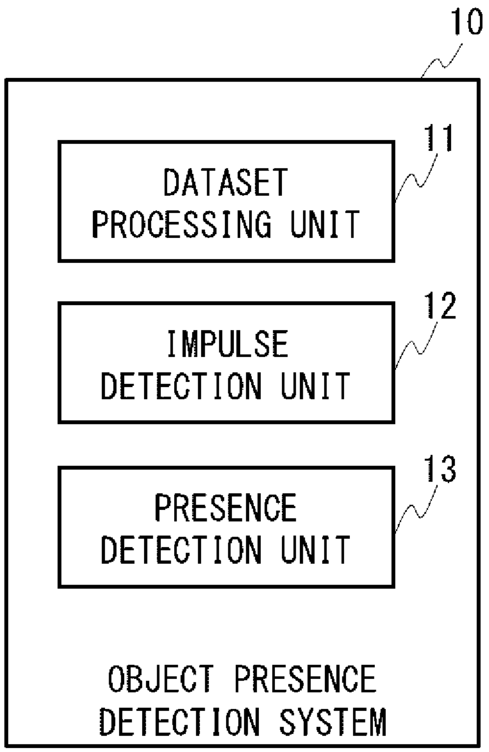

[Fig. 2]
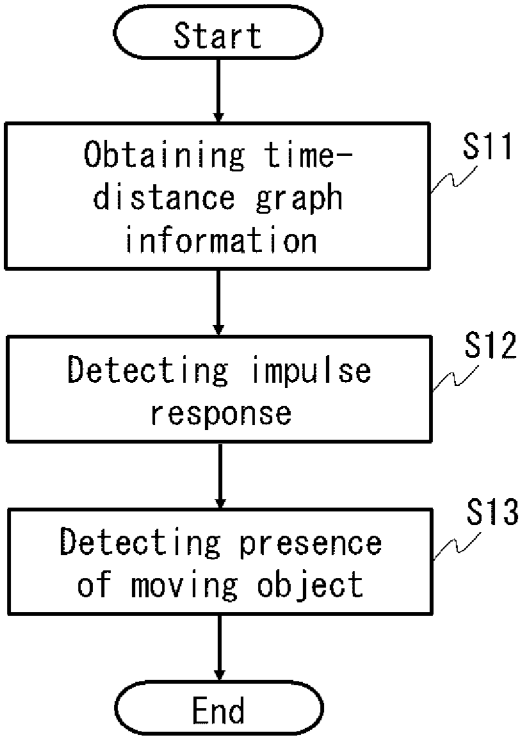
[Fig. 3]
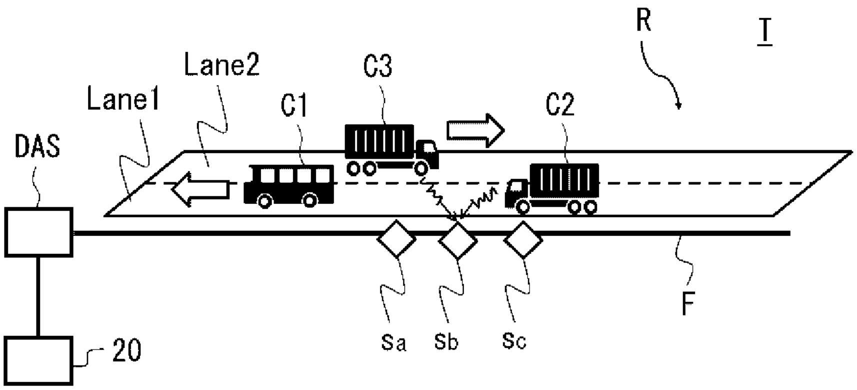

[Fig. 4]
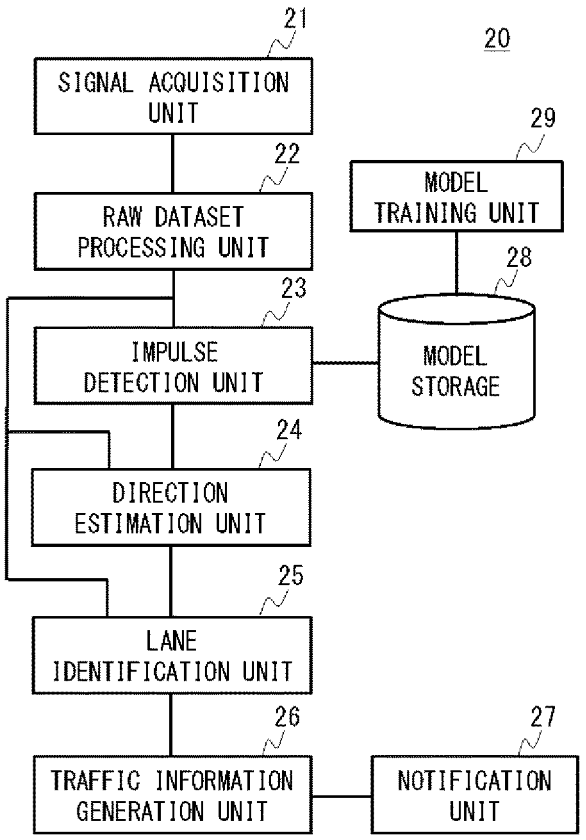
[Fig. 5]
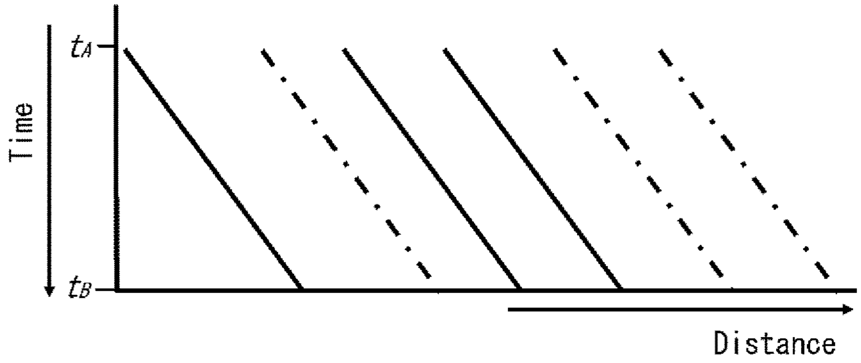

[Fig. 6A]
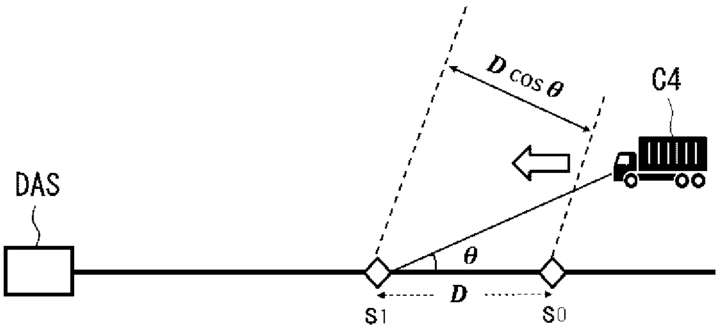
[Fig. 6B]
| θ | Source location |
|---|---|
| 0deg (0) < $\boldsymbol{\theta}$ < 90deg (π/2) | Right-side of $s_1$ |
| $\boldsymbol{\theta}$ = 90deg (π/2) | Perpendicular to $s_1$ |
| 90deg (π/2) < $\boldsymbol{\theta}$ < 180deg (π) | Left-side of $s_1$ |

[Fig. 6C]
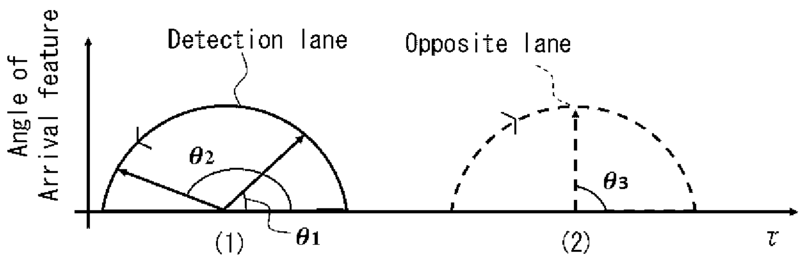
[Fig. 7A]
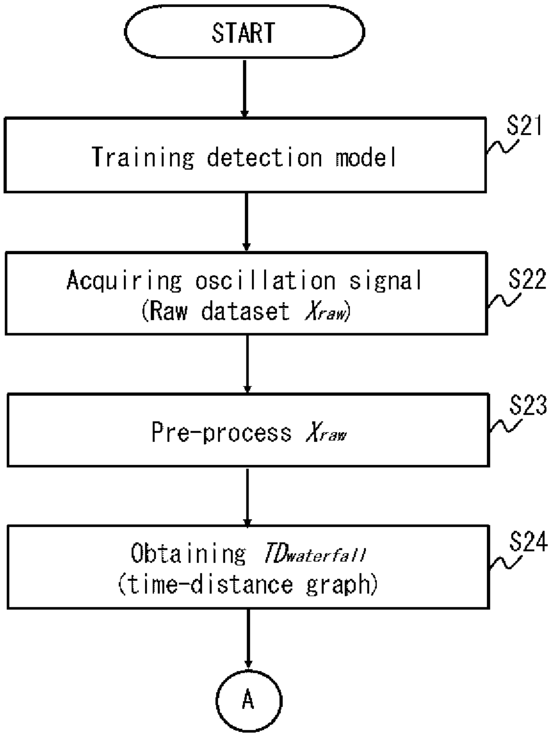

[Fig. 7B]
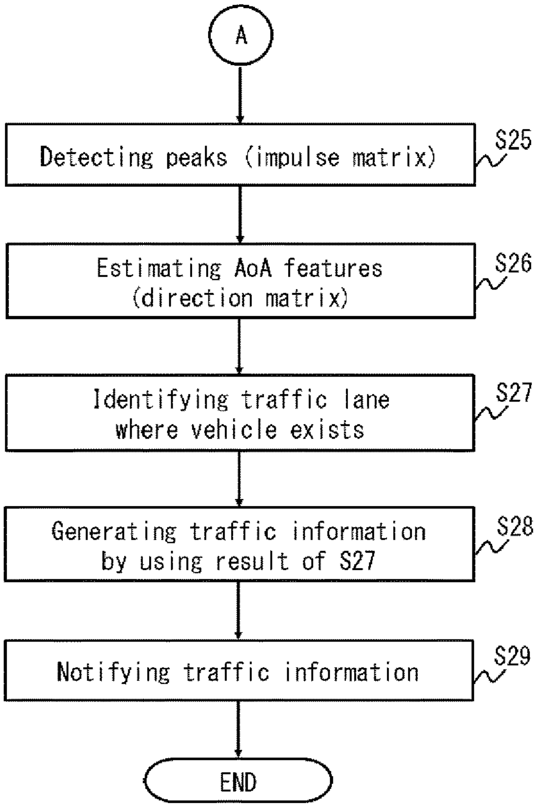
[Fig. 8]
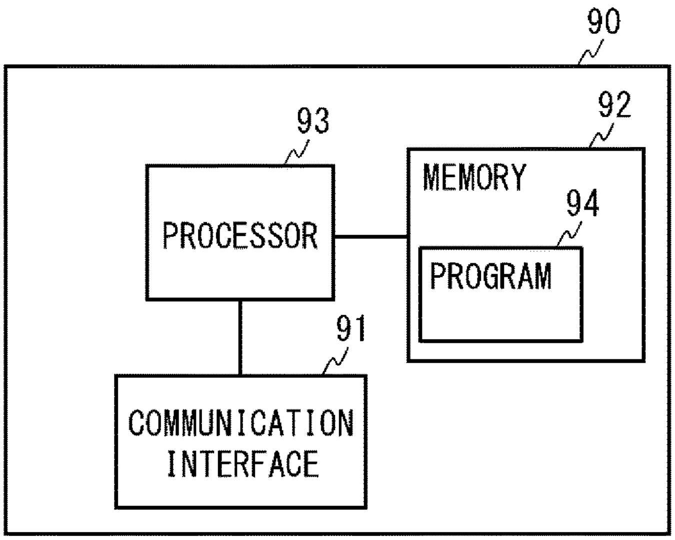

OBJECT PRESENCE DETECTION SYSTEM, OBJECT PRESENCE DETECTION METHOD AND COMPUTER READABLE MEDIUM

This application is a National Stage Entry of PCT/JP2021/033966 filed on Sep. 15, 2021, the contents of all of which are incorporated herein by reference, in their entirety.

TECHNICAL FIELD

The present disclosure relates to an object presence detection system, an object presence detection method and a non-transitory computer readable medium.

BACKGROUND ART

Monitoring system for infrastructures such as roads has been developed recently.

For example, Patent Literature 1 (PTL 1) discloses a position detection device for reducing accuracy in the detection of the position of a moving body. Specifically, this position detection device uses an optical fiber sensor, which is an optical transmission line laid along the movement path of a moving body, and includes a detector that detects back-scattered light generated in response to the optical pulse in the optical fiber sensor, a maximum value extraction unit that extracts the generation position at which the variation of the intensity of the back-scattered light within a search range is at a maximum, and an output unit that outputs the extraction result with the position of the moving body.

CITATION LIST

Patent Literature

PTL 1: International Patent Publication No. WO 2021/106025 A1

SUMMARY OF INVENTION

Technical Problem

Roads usually have lanes where vehicles travel in one direction and oncoming lanes where they travel in the opposite direction. Therefore, in the optical fiber measurement system described in PTL 1, the optical fiber detects raw vibration signal from both lanes and the device detects traffic information in both lanes in a mixed manner rather than in a separate manner for each lane. Consequently, there is a possibility that the presence of a vehicle existing in a certain lane cannot be accurately detected.

An object of the present disclosure is to provide an object presence detection system, an object presence detection method and a non-transitory computer readable medium capable of detecting the presence of an object more accurately.

Solution to Problem

According to a first aspect of the disclosure, there is provided an object presence detection system that includes: at least one memory configured to store instructions; and at least one processor configured to execute the instructions to: obtain time-distance graph information of an oscillation signal for each distributed sensing portion, while the oscillation signal is acquired by the plurality of distributed sensing portions and is induced by traffic of a moving object; detect impulse response using the time-distance graph information measured by the plurality of distributed sensing portions; and a detect a presence of the moving object, which includes moving direction information of the moving object, using the impulse response information in the time-distance graph information.

According to a second aspect of the disclosure, there is provided an object presence detection method performed by a computer that includes: obtaining time-distance graph information of an oscillation signal for each distributed sensing portion, while the oscillation signal is acquired by the plurality of distributed sensing portions and is induced by traffic of a moving object; detecting impulse response using the time-distance graph information measured by the plurality of distributed sensing portions; and detecting a presence of the moving object, which includes moving direction information of the moving object, using the impulse response information in the time-distance graph information.

According to a third aspect of the disclosure, there is provided a non-transitory computer readable medium storing a program for causing a computer to execute: obtaining time-distance graph information of an oscillation signal for each distributed sensing portion, while the oscillation signal is acquired by the plurality of distributed sensing portions and is induced by traffic of a moving object; detecting impulse response using the time-distance graph information measured by the plurality of distributed sensing portions; and detecting a presence of the moving object, which includes moving direction information of the moving object, using the impulse response information in the time-distance graph information.

Advantageous Effects of Invention

According to the present disclosure, it is possible to provide an object presence detection system, an object presence detection method and a non-transitory computer readable medium capable of detecting the presence of an object more accurately.

BRIEF DESCRIPTION OF DRAWINGS

FIG. 1 is a block diagram of an object presence detection system according to a first example embodiment.

FIG. 2 is a flowchart illustrating a method of the object presence detection system according to the first example embodiment.

FIG. 3 illustrates an object presence detection system and a schematic view of a road according to a second example embodiment.

FIG. 4 is a block diagram of a detection server according to the second example embodiment.

FIG. 5 is an example of a time-distance graph according to the second example embodiment.

FIG. 6A is a schematic diagram of the position of a vehicle and a sensor that measures an oscillation signal from the vehicle according to the second example embodiment.

FIG. 6B shows a table indicating the relationship between angle θ and source location (the vehicle's location) according to the second example embodiment.

FIG. 6C is a schematic diagram showing the relationship between t (time difference of arrival) and the angle θ.

FIG. 7A is a flowchart illustrating a method of the detection server according to the second example embodiment.

FIG. 7B is a flowchart illustrating a method of the detection server according to the second example embodiment.

FIG. 8 is a block diagram of a computer apparatus according to embodiments.

DESCRIPTION OF EMBODIMENTS

It should be noted that in the description of this disclosure, elements described using the singular forms such as "a", "an", "the" and "one" may be multiple elements unless explicitly stated.

First Example Embodiment

First, an object presence detection system 10 according to a first example embodiment of the present disclosure is explained with reference to FIG. 1.

Referring to FIG. 1, the object presence detection system 10 includes a dataset processing unit 11, an impulse detection unit 12 and a presence detection unit 13. The object presence detection system 10 may be one or more computers and/or machines. As an example, at least one of components in the object presence detection system 10 can be installed in a computer as a combination of one or a plurality of memories and one or a plurality of processors. The computer(s) used as the object presence detection system 10 may be a server.

The dataset processing unit 11 obtains time-distance graph information of an oscillation signal for each distributed sensing portion, while the oscillation signal is acquired by the plurality of distributed sensing portions and is induced by traffic of a moving object (target object). The distributed sensing portions may be multiple, spaced apart points on a long linear sensor (e.g., optical fiber cable), a plurality of independent sensors and so on. The distributed sensing portions are laid along the way through which the moving object passes. The moving object may be a variety of objects moving on land—for example, motor vehicles (including cars, motorcycles, buses, tracks or the like), trains, trams, bicycles, vehicles that are not moved by machines, pedestrians (walking persons) or the like, and the ways the moving object passes may be roads (including highways and ordinary roads), railroads, bridges, pedestrian or bicycle paths or the like. Also, the data which consists of the time-distance graph is also referred to as waterfall dataset in the disclosure.

Any known technologies can be applied to the processing of the dataset processing unit 11. For example, the object presence detection system 10 may obtain the raw dataset (oscillation signal) measured by the plurality of distributed sensing portions and pre-process the raw dataset into the time-distance. However, the dataset processing unit 11 may acquire the time distance graph information generated by another apparatus.

The impulse detection unit 12 detects impulse response using the time-distance graph information measured by the plurality of distributed sensing portions. The impulse response is induced by traffic of a moving object and included in the time-distance graph information. The impulse response may be described as an impulse matrix for subsequent processing. The impulse detection unit 12 can use various methods of analysis of data, such as Linear/Non-linear transformation methods and/or detection models trained by Artificial Intelligence (AI). The details of these methods will be explained later.

The presence detection unit 13 detects a presence of the moving object, which includes moving direction information of the moving object, using the impulse response information in the time-distance graph information. For example, the presence detection unit 13 may use the impulse response information for the plurality of the distributed sensing portion to perform Angle-of-Arrival (AoA) and/or Time Difference of Arrival (TDoA) method, and thereby obtain a direction matrix.

Next, referring to the flowchart in FIG. 2, an example of the operation of the present example embodiment will be described. The detail of each processing in FIG. 2 is already explained.

First, the dataset processing unit 11 obtains the time-distance graph information of an oscillation signal for each distributed sensing portion (step S11). The dataset processing unit 11 outputs the time-distance graph information to the impulse detection unit 12.

Next, the impulse detection unit 12 detects impulse response using the time-distance graph information measured by the plurality of distributed sensing portions (step S12). The dataset processing unit 11 outputs the impulse response information to the presence detection unit 13.

After that, the presence detection unit 13 detects a presence of the moving object, which includes moving direction information of the moving object (step S13). It should be noted that the object presence detection system 10 may process these steps for not only a single moving object but also each of the plurality of moving objects. The object presence detection system 10 may use the result of the presence of the moving object to generate traffic information about the way which the moving object is passing—the traffic information may include the information on the moving object's location and movement status.

As the object presence detection system 10 detects impulse response using the time-distance graph information, it can calculate moving direction information of the moving object as well as presence information of the moving object. Therefore, the object presence detection system 10 can detect the presence of an object more accurately.

Second Example Embodiment

A second example embodiment of this disclosure will be described below referring to the accompanied drawings. This second example embodiment explains one of the specific examples of the first example embodiment, however, specific examples of the first example embodiment are not limited to this example embodiment.

FIG. 3 illustrates a traffic event detection system T (object presence detection system) that includes an optical fiber cable F (sensing optical fiber), a Distributed Acoustic Sensor (DAS: it functions as a sensing device) and a detection server 20. Besides, FIG. 3 shows a schematic illustration of a view of a road R with the optical fiber cable F placed along the road R, especially along a presence detection target lane (hereinafter referred to as a detection lane). The optical fiber cable F is installed under and along the road R and used for measuring response oscillation of the road R due to vehicles C1 to C3 shown in FIG. 3, which are moving objects and are passing along the optical fiber cable F. Further, the optical fiber cable F includes a plurality of sensing portions, such as $s_a$ to $s_c$. Each of sensing portions in the optical fiber cable F will be referred to as a sensor.

In FIG. 3, the vehicles C1 and C2 in the lane 1 are passing the road R from the right side to the left side, and the vehicle C3 in the lane 2 is moving in the opposite direction of the vehicles C1 and C2. The detection server 20 monitors the road R and can detect each traffic event of the vehicles.

An oscillation signal (for example, acoustics or vibration data) is induced in the optical fiber cable F by the vehicles (especially by axles of the vehicles passing on the road R with the optical fiber cable). That is, the oscillation signal represents oscillation on the road R. For example, in FIG. 3, the sensor $s_b$ detect oscillation signal from the vehicle C2 and C3.

The DAS detects the oscillation signal at each of the plurality of sensor of the optical fiber cable F. The DAS is able to detect the oscillation signal of the road R induced by axles of a vehicle, when the vehicle is passing on any traffic lane of the road R. The oscillation signals can be measured at any location on the fiber cable F. For example, when the sensing range is 50 km and the spatial resolution is 4 m, the oscillation signal at 12500 points (sensing channels) could be measured. The DAS transmits the oscillation signal in digital data via wired communication to the detection server 20. However, the communication between the DAS and the detection server 20 can be done by wireless communication.

FIG. 4 is a block diagram of the detection server 20. Referring to FIG. 4, the detection server 20 includes a signal acquisition unit 21, a raw dataset processing unit 22, an impulse detection unit 23, a direction estimation unit 24, a lane identification unit 25, a traffic information generation unit 26, a notification unit 27, a model storage 28 and a model training unit 29. The detection server 20 is one specific example of the object presence detection system 10 and it may include other units for computation. Each unit of the detection server 20 will be explained in detail.

The signal acquisition unit 21 functions as an interface of the detection server 20 and acquires the raw oscillation signal data (hereinafter also referred to raw dataset: $X_{raw}$) from the DAS. The signal acquisition unit 21 outputs the $X_{raw}$ to the raw dataset processing unit 22. Furthermore, the signal acquisition unit 21 may preprocess the $X_{raw}$, if necessary. For example, the signal acquisition unit 21 may filter the $X_{raw}$ and output the filtered $X_{raw}$.

The raw dataset processing unit 22 is one example of the dataset processing unit 11 in the first example embodiment and pre-processes the $X_{raw}$. Specifically, the raw dataset processing unit 22 uses a band-pass filter focusing on structure resonant frequencies and standardize the $X_{raw}$ to obtain a standard amplitude of each signal in $X_{raw}$. After that, it uses the standardized $X_{raw}$ to calculate a time-distance graph for each of the plurality of sensors of the optical fiber cable F by applying sum of absolute intensities to a window of a predetermined length of the oscillation signal. The data which consists of the time-distance graph is also referred to as waterfall dataset $TD_{waterfall}$ in the disclosure. The $TD_{waterfall}$ is multi-channel (at least 2 channels) data and data over all measured times. The raw dataset processing unit 22 outputs the $X_{raw}$ to the impulse detection unit 23 and the direction estimation unit 24 and $TD_{waterfall}$ to the lane identification unit 25.

FIG. 5 illustrates an example snap of the waterfall dataset $TD_{waterfall}$. The time-distance graph shown in FIG. 5 shows the waterfall dataset from time $t_A$ to time $t_B$. Each line in FIG. 5 shows each trajectory of the vehicle. Vibration intensities of the optical fiber cable F (the oscillation signal) are visible, which are proportional to the type of the vehicle passing on the road R. In FIG. 5, the high-vibration intensity of the vehicle is shown as solid lines and the low-vibration intensity of the vehicle is shown as dash-dotted lines. The example of the former vehicle is a truck or bus, and the example of the latter vehicle is a passenger car.

The raw dataset processing unit 22 may process only the $X_{raw}$ measured within a target monitoring section of multiple channels (multiple sensors). The target monitoring section is a part of the sensing range to be analyzed in the detection server 20. For example, it is a section of 10 to 50 meters, but not limited to this.

Referring back to FIG. 4, the impulse detection unit 23 is one example of the impulse detection unit 12 in the first example embodiment. Specifically, the impulse detection unit 23 receives the pre-processed $X_{raw}$ dataset and performs the following processes by using the $X_{raw}$ dataset.

(1a) First, the impulse detection unit 23 performs feature reduction (dimensionality reduction) process on the $X_{raw}$. The feature reduction can reduce the number of features in the $X_{raw}$. For example, it applies Non-linear transformation method(s), such as Fast Fourier Transformation (FFT), which can aggregate amplitudes of the data, Principal Component Analysis (PCA) and/or Independent Component Analysis (ICA) to the feature reduction process. This process reduces the input signal from multiple channels to a single channel, thereby it can reduce subsequent calculation processes.

(1b) Next, the impulse detection unit 23 detects impulse response by using detection methods, e.g., clustering, amplitude-thresholds or the like. The impulse response is originally measured by each of a plurality of sensors, however, the impulse detection unit 23 may extract the impulse response of predetermined target monitoring section from all the impulse response. The impulse response is also referred to as peaks of the oscillation data in the disclosure.

In this example, the impulse detection unit 23 uses a detection model trained by Artificial Intelligence (AI). This AI is included in the detection server 20 and performs the unsupervised model training for the detection model. However, the AI may be included in another computer. The detection model may function as an impulse response function-based filter, and it is stored in the model storage 28. By inputting the processed data to the trained model, the impulse detection unit 23 obtains impulse response information.

(1c) Then, the impulse detection unit 23 converts the result of (1b), namely the peaks of the data, to binary matrix format. This binary matrix indicates impulse presence of the data (impulse response information in the time-distance graph information), and is also referred to as an impulse matrix. The following is an example of the impulse matrix;

$$I = \begin{bmatrix} 0 \\ 0 \\ 1 \\ 1 \\ 1 \\ \vdots \\ 0 \\ 0 \end{bmatrix}_{T*M} \quad \text{(m1)}$$

In (m1), each element of this matrix represents a value at each measured time of the data. The impulse detection unit 23 outputs the impulse matrix to the direction estimation unit 24.

Referring back to FIG. 4, the direction estimation unit 24 receives the $X_{raw}$ and impulse matrix. In this example embodiment, the direction estimation unit 24 is one example of the presence detection unit 13 in the first example embodiment. The direction estimation unit 24 performs the following processes by the information.

(2a) First, the direction estimation unit 24 extracts the $X_{raw}$ over a given time range from the received $X_{raw}$ over all measured times. The direction estimation unit 24 analyses the impulse matrix to set the given time range as the one when the impulse(s) is detected in the impulse matrix.

(2b) Next, the direction estimation unit 24 applies a band-pass filter to the extracted $X_{raw}$ over the given time range to generate intermediate data with clearer structural properties in a given frequency range (e.g., low frequency band, such as 1 Hz-20 Hz). In another words, the intermediate data shows peak frequencies of the original $X_{raw}$ data.

(2c) Further, in this embodiment, the direction estimation unit 24 applies the Angle of Arrival (AoA) and Time Difference of Arrival (TDoA) method to the intermediate data to calculate time difference of arrival of propagating oscillations (arrival time difference) between the plurality of distributed sensors, thereby estimates direction of the angle of the vehicle crossing the optical fiber cable F (arrival direction).

FIGS. 6A to 6C illustrate the principle of the AoA and TDoA method used in (2c). In FIG. 6A, a vehicle C4 is passing from the right side to the left side. FIG. 6A also shows sensors $s_0$ and $s_1$ of the optical fiber cable F connected to the DAS. The sensor $s_0$ is a reference sensor and the sensor $s_1$ is a target sensor. The distance between the sensor $s_0$ and $s_1$ is D, and the angle (angle of arrival) between the optical fiber cable F and the direction of the oscillation signal from the vehicle C4 to the sensor $s_0$ is θ. In another words, θ is angle of source (the vehicle C4) at the sensor $s_1$.

In FIG. 6A, θ can be calculated as follows:

$$\theta = \cos^{-1}\left(\frac{c\tau_{01}}{D}\right) \quad \text{(m2)}$$

where, $\tau_{01}$=time difference of arrival of the oscillation signal from $s_0$ to $s_1$ c=propagation wave speed of the oscillation signal FIG. 6B shows a table indicating the relationship between angle θ and source location (the vehicle C4's location). If θ is greater than 0deg (0) and less than 90deg (π/2), the vehicle C4 is on the right side of the sensor $s_1$ in FIG. 6A. If θ is equal to 90deg (π/2), the vehicle C4 is on an extension drawn perpendicular to the optical fiber cable F from the sensor $s_1$. Further, if θ is greater than 90deg (π/2) and less than 180deg (x), the vehicle C4 is on the left side of the sensor $s_1$ in FIG. 6A.

FIG. 6C shows the relationship between τ (time difference of arrival) and the angle θ. (1) in FIG. 6C shows the relationship of the detection lane. In FIG. 6C, if θ1 is greater than 0deg (0) and less than 90deg (π/2), the vehicle C4 related to θ1 which is on the detection lane is located on the right side of the sensor $s_1$. Also, if θ2 is greater than 0deg (0) and less than 90deg (x/2), the vehicle C4 related to θ2 which is on the detection lane is located on the right side of the sensor $s_1$. Further, (2) in FIG. 6C shows the relationship of the opposite lane (i.e., non-detection lane). if θ3 is equal to 90deg (π/2), the vehicle C4 related to θ3 which is on the opposite lane is on an extension drawn perpendicular to the optical fiber cable F from the sensor $s_1$.

The direction estimation unit 24 knows the value of D and also detects the values of $\tau_{01}$ and c from the intermediate data (the $X_{raw}$ data), therefore it can calculate θ using the formula (m3). The value of c may be calibrated during system installation, therefore, the direction estimation unit 24 can use the measured approximate value c. However, the value of c may be constant value, thus the direction estimation unit 24 knows this value in advance. This is how the direction estimation unit 24 separates vehicle direction information (θ) from the $X_{raw}$.

(2d) Finally, the direction estimation unit 24 converts the result of (2c), namely the vehicle direction information (θ), to binary matrix format. This binary matrix indicates direction of the vehicle information, and is also referred to as a direction matrix (AoA features). The direction matrix may be obtained by gradient of time difference of arrival features, for example, time difference of arrival will change from leading time to lagging time as the vehicle pass from the sensing location and time difference of arrival may also change from lagging time to leading time depend on vehicle direction, thereby, a gradient may be obtained from time difference of arrival and converted to binary matrix format. The following is an example of the direction matrix;

$$\begin{matrix} (T) & (O) \end{matrix} \quad \text{(m3)}$$

$$D = \begin{bmatrix} 0 & 1 \\ 0 & 1 \\ 1 & 1 \\ 1 & 0 \\ 1 & 0 \\ \vdots & \vdots \\ 0 & 0 \\ 0 & 0 \end{bmatrix}_{T*L}$$

In (m3), each element of this matrix represents a value at each measured time of the data. Also, the column (T) of the matrix D is the data of the detection lane, and the column (O) of the matrix (m3) is the data of the opposite lane.

The direction matrix includes presence information of the vehicle, which includes moving direction information of the vehicle. The direction estimation unit 24 outputs the direction matrix to the lane identification unit 25.

Referring back to FIG. 4, the lane identification unit 25 receives the $TD_{waterfall}$ and the direction matrix, and performs the following processes.

First, the lane identification unit 25 uses the $TD_{waterfall}$ (time-distance graph) to extract the trajectory of the target vehicle by deep neural network. For example, the lane identification unit 25 generates the mask matrix using TrafficNet model, which is one example of the deep neural network capable of generating the mask matrix of the $TD_{waterfall}$. In this way, the direction estimation unit 24 can estimate a trajectory of the vehicle as a form of the mask matrix.

Second, the lane identification unit 25 identifies a traffic lane on a road where the target vehicle exists (e.g., up-line or down-line) by analyzing the trajectory of the vehicle and the direction matrix (the presence information of the vehicle). For example, in case of FIG. 3, if target vehicle is the vehicle C1, the lane identification unit 25 can identify the vehicle C1 is moving in the lane 1, not the lane 2. The lane identification unit 25 outputs the result of the lane identification and the direction matrix to the traffic information generation unit 26.

The signal acquisition unit 21, the raw dataset processing unit 22, the impulse detection unit 23, the direction estimation unit 24 and the lane identification unit 25 can also perform the above processes for multiple vehicles, one for each vehicle.

The traffic information generation unit 26 receives the result of the lane identification and the direction matrix, and use them to generate traffic information regarding the road where the target vehicle exists. Further, the traffic information generation unit 26 can accumulate a plurality of vehicles' information of the result of the lane identification and the direction matrix, and generate traffic information regarding the road where these vehicles are moving by analyzing the information. For example, in case of FIG. 3, the traffic information generation unit 26 can generate the traffic information regarding the road R. Specifically, the traffic information includes information on which lane each vehicle is traveling in and where it is located. By generating this traffic information at each measurement time of the oscillation signal, the traffic information generation unit 26 is also able to detect the speed of each vehicle and also update the detected speed. The traffic information generation unit 26 outputs the traffic information including the speed information of each vehicle to the notification unit 27.

The notification unit 27 is an I/O interface which notifies the traffic information of each vehicle to another system or device. For example, the notification unit 27 sends the information to automatic operation system, which controls autonomous (unmanned) vehicle travel on the road.

Specific examples will be explained further: in an expressway, consider the situation of a junction point where a branched road joins the main line of the expressway. When an autonomous vehicle attempts to move from the branched road to the main line, the vehicle needs to know the traffic information (where other vehicles are located and at what speed they are traveling) on the main line. Thus, the vehicle be connected to a control server in the automatic operation system, generally known as Intelligent Transport System (ITS). In this situation, if the detection server 20 shares the traffic information with the control server in real-time, the control server can analyse the traffic information to generate and output real-time instructions for controlling detailed travel of the vehicle. Therefore, by following its instructions, the vehicle can run towards the junction so as not to come into contact with any other vehicle on the main line traveling towards the junction. In this example, the target monitoring section includes an area of the main line around the junction.

In the above example, the control server and this detection server 20 are described as being independent of each other. However, the detection server 20 may further include an automatic operation control unit and serve as a control server in the automatic operation system. In addition, the detection server 20 may alert traffic flow monitoring system of the traffic information.

The model storage 28 stores the detection model used by the impulse detection unit 23. Also, it may store methods and band-pass filters used in each unit of the detection server 20.

The model training unit 29 includes the AI and trains the detection model stored in the model storage 28 to learn vehicle-presence features (peaks) in training dataset corresponding to impulse responses of the vehicle. The impulse responses may be the data within a target monitoring section.

Next, referring to the flowchart in FIGS. 7A and 7B, an example of the operation of the detection server 20 will be described. The detail of each processing in FIGS. 7A and 7B is already explained.

First, before measurement, the model training unit 29 trains the detection model and stores the trained model in the model storage 28 (step S21). The trained model will be used in a later process.

Next, the signal acquisition unit 21 acquires the raw oscillation signal (raw dataset $X_{raw}$) (step S22). After that, the raw dataset processing unit 22 pre-processes the $X_{raw}$ (step S23). As a result of this, the raw dataset processing unit 22 obtains the waterfall dataset $TD_{waterfall}$ (time-distance graph) and pre-processed dataset $X_{raw}$ (step S24).

Then, the impulse detection unit 23 detects the peaks (impulse matrix) by using the feature reduction process and detection methods (step S25). After that, the direction estimation unit 24 estimates the direction matrix (AoA features) (step S26).

The lane identification unit 25 identifies a traffic lane on a road where the target vehicle exists (step S27). Then, the traffic information generation unit 26 generates traffic information by using the result of the step S27 (step S28). Finally, the notification unit 27 notifies the traffic information of each vehicle (step S29).

In related art, waterfall dataset (time-distance graph) is used in traffic monitoring applications to estimate traffic flow parameters. However, an oscillation signal induced by vehicle presence on a detection lane may be affected by another vehicle's signal on an opposite lane. Therefore, there is a possibility that a vehicle in the opposite lane, not in the detection lane, could be mistakenly detected as being in the detection lane.

In this disclosure, the detection server 20 can detect the impulse matrix using the time-distance graph information, it can calculate moving direction information of a vehicle. Therefore, the detection server 20 can detect the presence of the vehicle.

Further, the model training unit 29 may train the detection model, which is used by the impulse detection unit 23 to detect the impulse matrix, to learn vehicle-presence features (peaks) in training dataset. In this way, the detection server 20 can detect the presence of the vehicle more accurately by using the trained detection model.

Further, the impulse detection unit 23 may perform feature reduction processing on the time-distance graph information to obtain the impulse response information. Therefore, the computation process done by the impulse detection unit 23 can be reduced.

Further, the direction estimation unit 24 may use the extracted time-distance graph information to detect the presence of a vehicle. Since the direction estimation unit 24 only needs to calculate for the extracted time-distance graph information, not all of the information, the amount of calculation required can be reduced.

Further, the direction estimation unit 24 may determine the arrival time difference of the impulses between the plurality of distributed sensors, and calculate the moving direction information using the arrival time difference. Since the direction estimation unit 24 uses the highly scalable, less complex method, the direction estimation unit 24 can calculate the moving direction information in a variety of situations.

Further, the traffic event detection system T may include an optical fiber cable as the plurality of sensors. Therefore, the traffic event detection system T can detect the traffic events of the vehicle.

Further, the lane identification unit 25 uses the trajectory and the presence of the vehicle to identify a traffic lane on a road where the vehicle exists. In this way, the detection server 20 can know the detailed traffic information.

Further, the notification unit 27 notifies the presence of the vehicle and the traffic lane where the vehicle exists. Thus, another system, such as automatic operation system and traffic flow monitoring system, can use the traffic information for safe and efficient traffic.

Modification and adjustment of each example embodiment and each example are possible within the scope of the overall disclosure (including the claims) of the present disclosure and based on the basic technical concept of the present disclosure. The present embodiments are, therefore, to be considered in all respects to be illustrative and not restrictive.

For example, the direction estimation unit 24 does not have to extract the $TD_{waterfall}$ over a given time range in (2a). In other words, the direction estimation unit 24 may use the $TD_{waterfall}$ over all measured times. In such a case, after the processes of (2b), (2c) and (2d), to calculate the same direction matrix as described earlier in (2d), the direction estimation unit 24 calculates the matrix V, which is the product set of the impulse matrix I and the direction matrix D, as follows:

$$V_{T*L} = D_{T*L} \cap I_{T*M} \tag{m4}$$

This matrix V is the same as the direction matrix as described earlier in (2d). The amount of computation required for the direction estimation unit 24 described in the second example embodiment is less than the amount of computation required for the processing described here.

In addition, the direction estimation unit 24 may use the trajectory extracted by the lane identification unit 25 to calibrate the matrix D and/or V. The columns of matrix D or V represents each lane (up-line or down-line) information of vehicle presence, therefore, the direction estimation unit 24 can use the trajectory to verify whether the calculation of the matrix D or V is accurate or not.

The vehicle-detection method described in the second example embodiment can be applied to detect another moving object. For example, it enables to detect a pedestrian walking on a side walk and bicycle moving on a bicycle track/road.

Next, a configuration example of the traffic event detection apparatus explained in the above-described plurality of embodiments is explained hereinafter with reference to FIG. 8.

The object presence detection system, which includes both examples of the object presence detection system 10 and the traffic event detection system T, may be implemented on a computer system as illustrated in FIG. 8. Referring to FIG. 8, a computer system 90, such as a server or the like, includes a communication interface 91, a memory 92 and a processor 93.

The communication interface 91 (e.g., a network interface controller (NIC)) may be configured to communicatively connect to sensor(s) provided in an infrastructure. For example, as shown in FIG. 3, the sensor(s) may be provided under lanes of a road. Furthermore, the communication interface 91 may communicate with other computer(s) and/or machine(s) to receive and/or send data related to the computation of the computer system 90.

The memory 92 stores program 94 (program instructions) to enable the computer system 90 to function as the object presence detection system 10 or the detection server 20. The memory 92 includes, for example, a semiconductor memory (for example, Random Access Memory (RAM), Read Only Memory (ROM), Electrically Erasable and Programmable ROM (EEPROM), and/or a storage device including at least one of Hard Disk Drive (HDD), SSD (Solid State Drive), Compact Disc (CD), Digital Versatile Disc (DVD) and so forth. From another point of view, the memory 92 is formed by a volatile memory and/or a nonvolatile memory. The memory 92 may include a storage disposed apart from the processor 93. In this case, the processor 93 may access the memory 92 through an I/O interface (not shown).

The processor 93 is configured to read the program 94 (program instructions) from the memory 92 to execute the program 94 (program instructions) to realize the functions and processes of the above-described plurality of embodiments. The processor 93 may be, for example, a microprocessor, an MPU (Micro Processing Unit), or a CPU (Central Processing Unit). Furthermore, the processor 93 may include a plurality of processors. In this case, each of the processors executes one or a plurality of programs including a group of instructions to cause a computer to perform an algorithm explained above with reference to the drawings.

The program 94 includes program instructions (program modules) for executing processing of each unit of the traffic event detection apparatus in the above-described plurality of embodiments.

The program includes instructions (or software codes) that, when loaded into a computer, cause the computer to perform one or more of the functions described in the embodiments. The program may be stored in a non-transitory computer readable medium or a tangible storage medium. By way of example, and not limitation, non-transitory computer readable media or tangible storage media can include a random-access memory (RAM), a read-only memory (ROM), a flash memory, a solid-state drive (SSD) or other memory technologies, CD-ROM, digital versatile disk (DVD), Blu-ray disc ((R): Registered trademark) or other optical disk storage, magnetic cassettes, magnetic tape, magnetic disk storage or other magnetic storage devices. The program may be transmitted on a transitory computer readable medium or a communication medium. By way of example, and not limitation, transitory computer readable media or communication media can include electrical, optical, acoustical, or other form of propagated signals.

Various combinations and selections of various disclosed elements (including each element in each example, each element in each drawing, and the like) are possible within the scope of the claims of the present disclosure. That is, the present disclosure naturally includes various variations and modifications that could be made by those skilled in the art according to the overall disclosure including the claims and the technical concept.

REFERENCE SIGNS LIST

10 object presence detection system
11 dataset processing unit
12 impulse detection unit
13 presence detection unit
20 detection server
21 signal acquisition unit
22 raw dataset processing unit
23 impulse detection unit
24 direction estimation unit
25 lane identification unit
26 traffic information generation unit
27 notification unit
28 model storage

29 model training unit
F optical fiber cable
DAS Distributed Acoustic Sensor
T traffic event detection system
90 computer system
91 communication interface
92 memory
93 processor
94 program

What is claimed is:

1. An object presence detection system comprising: at least one memory configured to store instructions; and at least one processor configured to execute the instructions to: obtain time-distance graph information of an oscillation signal for each distributed sensing portion, while the oscillation signal is acquired by the plurality of distributed sensing portions and is induced by traffic of a moving object; detect impulse response using the time-distance graph information measured by the plurality of distributed sensing portions; convert the detected impulse response information to an impulse matrix, the impulse matrix being a binary matrix; extract the oscillation signal over a given time range at the time that an impulse is detected in the impulse matrix, generate intermediate data indicating peak frequencies of the extracted oscillation signal, and detect moving direction information of the moving object for the distributed sensing portions using the intermediate data; and control the moving object based on the moving direction information of the moving object.

2. The object presence detection system according to claim 1, wherein the at least one processor is further configured to:

train a model to learn moving object presence features in training dataset corresponding to impulse responses of the moving object, wherein the at least one processor uses the model to detect the impulse response information.

3. The object presence detection system according to claim 1, wherein the at least one processor is further configured to:

perform feature reduction processing on the time-distance graph information and obtain the impulse response information from the trained model by inputting the processed data.

4. The object presence detection system according to claim 1, wherein the at least one processor is further configured to:

extract the time-distance graph information of the time range in which an impulse indicated by the impulse response information is detected, and use the extracted time-distance graph information to detect a presence of the moving object.

5. The object presence detection system according to claim 4, wherein the at least one processor is further configured to:

use the extracted time distance graph information to determine an arrival time difference of the impulses between the plurality of distributed sensing portions, and calculate the moving direction information using the arrival time difference.

6. The object presence detection system according to claim 1, further comprising:

an optical fiber cable, wherein the optical fiber cable includes the plurality of distributed sensing portions.

7. The object presence detection system according to claim 1, wherein the at least one processor is further configured to:

use the time-distance graph information to extract a trajectory of the moving object and use the trajectory and a presence of the moving object to identify a traffic lane on a road where the moving object exists.

8. The object presence detection system according to claim 7, wherein the at least one processor is further configured to:

notify the presence of the moving object and the traffic lane where the moving object exists.

9. An object presence detection method performed by a computer comprising: obtaining time-distance graph information of an oscillation signal for each distributed sensing portion, while the oscillation signal is acquired by the plurality of distributed sensing portions and is induced by traffic of a moving object; detecting impulse response using the time-distance graph information measured by the plurality of distributed sensing portions; converting the detected impulse response information to an impulse matrix, the impulse matrix being a binary matrix; extracting the oscillation signal over a given time range at the time that an impulse is detected in the impulse matrix, generating intermediate data indicating peak frequencies of the extracted oscillation signal, and detecting moving direction information of the moving object for the distributed sensing portions using the intermediate data; and controlling the moving object based on the moving direction information of the moving object.

10. A non-transitory computer readable medium storing a program for causing a computer to execute: obtaining time-distance graph information of an oscillation signal for each distributed sensing portion, while the oscillation signal is acquired by the plurality of distributed sensing portions and is induced by traffic of a moving object; detecting impulse response using the time-distance graph information measured by the plurality of distributed sensing portions; converting the detected impulse response information to an impulse matrix, the impulse matrix being a binary matrix; extracting the oscillation signal over a given time range at the time that an impulse is detected in the impulse matrix, generating intermediate data indicating peak frequencies of the extracted oscillation signal, and detecting moving direction information of the moving object for the distributed sensing portions using the intermediate data; and controlling the moving object based on the moving direction information of the moving object.

* * * * *